United States Patent

Carcone et al.

[11] Patent Number: 5,608,159
[45] Date of Patent: Mar. 4, 1997

[54] FREEZE SEAL AND FREEZE CLAMP FOR CABLES, WIRES, OPTICAL FIBERS AND THE LIKE

[75] Inventors: John M. Carcone, Westwood; Jon W. Engelberth, Denville; James T. LaGrotta, Boonton Township, Morris County; Joseph V. Newell, East Hanover, all of N.J.

[73] Assignee: Lucent Technologies Inc., Murray Hill, N.J.

[21] Appl. No.: 417,423

[22] Filed: Apr. 5, 1995

[51] Int. Cl.[6] .............................. G01M 19/00; F16L 3/08; F16L 7/02
[52] U.S. Cl. .................. 73/49.8; 62/66; 62/293; 226/8
[58] Field of Search .................. 138/89, 90, 91; 226/8, 93; 405/154; 62/66, 293, 37, 40; 73/40.5 R, 49.8, 49.1, 49.5

[56] References Cited

U.S. PATENT DOCUMENTS

| | | | |
|---|---|---|---|
| 3,041,850 | 7/1962 | Nunn | 62/293 |
| 3,623,337 | 11/1971 | Tremont | 62/66 |
| 3,827,282 | 8/1974 | Brister | 73/40.5 R |
| 3,926,006 | 12/1975 | Brooks et al. | 405/154 |
| 4,112,706 | 9/1978 | Brister | 62/514 R |
| 4,220,012 | 9/1980 | Brister | 62/130 |
| 4,267,699 | 5/1981 | Bahrenburg | 62/66 |
| 4,314,577 | 2/1982 | Brister | 137/13 |
| 4,370,862 | 2/1983 | Brister | 62/66 |
| 4,416,118 | 11/1983 | Brister | 62/66 |
| 4,428,204 | 1/1984 | Brister | 62/62 |
| 4,433,556 | 2/1984 | Brady | 62/293 |
| 4,441,328 | 4/1984 | Brister | 62/53 |
| 5,125,427 | 6/1992 | Cantu et al. | 137/13 |

*Primary Examiner*—Michael Brock

[57] ABSTRACT

A freeze device for an elongated element includes a pressure vessel disposed about at least a part of the element and a freeze seal between the part of the elongated element and the pressure vessel. The freeze seal includes a frozen material exerting a force inwardly against the part of the element and outwardly against the pressure vessel by virtue of having been frozen in situ such that the frozen material thereby seals the elongated element to the pressure vessel.

36 Claims, 11 Drawing Sheets

FREEZE SEAL AND FREEZE CLAMP FOR CABLES, WIRES, OPTICAL FIBERS AND THE LIKE

BACKGROUND OF THE INVENTION

This invention relates to a freeze seal and freeze clamp for cables, wires, optical fibers and other elements requiring a seal or a clamp.

The present invention can be used, for example, for testing cables or hardware components having a cable connected thereto. Undersea cable and undersea hardware components for example require testing during development and as part of quality assurance. According to one procedure, in order to test such cable or hardware component, the cable or hardware component is disposed in a pressure vessel and the pressure vessel pressurized to the desired test pressure. However, it is necessary that the cable extend externally of the pressure vessel because only a small section or mid-span portion of an elongated cable may be tested or because the hardware component being tested has a cable connected thereto which extends externally of the pressure vessel. Since the cable is required to penetrate the pressure vessel, it is necessary to provide a seal between the cable and the pressure vessel in order that the pressure vessel can be pressurized.

Heretofore, such seal was a gland seal which was specifically modified to accommodate the requirements of the particular cable which penetrated the pressure vessel. For example, the seal would have to be modified depending on the physical characteristics of the particular cable being tested such as its diameter, cross sectional geometry, surface characteristics, the material of the cable and whether there was one or more cables to be sealed. Such modifications would often result in requiring a redesign of the seal for different cables in order to adapt the seal to the particular cable or cables to be tested.

It is desirable that a seal used for testing of such cables and hardware components include the following characteristics:

(a) the seal should be a universal pressure seal that conforms directly to the outer layer of the cable regardless of cable size, construction, or surface condition;

(b) the seal should have a zero leak rate;

(c) the seal should provide a force capable of restraining the cable from moving through the seal at the maximum chamber pressure;

(d) the seal should be easy to install and remove;

(e) the seal should not damage or degrade the performance of the cable; and (f) the seal should operate on cables at the free ends or at mid-span, that is, the pressure vessel and cable seal can be modified to a split design that is capable of capturing the cable anywhere along the length of the cable, for example, for local pressure testing of a repeater or splice housing in the center or mid-span of a long cable on a factory floor.

SUMMARY OF THE INVENTION

The present invention is able to satisfy all of these criteria while at the same time effecting a seal on various cables having a wide variety of physical characteristics without requiring redesign or major modification of the seal. The present invention is also able to effect a clamping action on the cable to securely clamp the cable to the pressure vessel.

The present invention is also able to provide a seal for small diameter elements such as optical fibers. For example, one or more optical fibers may be connected to a hardware component requiring pressure testing in a vessel subjected to pressure. The present invention can provide a freeze seal for the optical fiber to enable the optical fiber to extend externally of the pressure vessel to enable pressure testing of the hardware component within the pressurized testing vessel.

The present invention is also directed to a freeze clamp wherein the freeze clamp provides a clamping force which clamps a cable or other element to be clamped and enables application of a tension force to pull or lift the cable or other element in various applications such as manipulating an undersea cable.

Accordingly, it is an object of the present invention to provide a freeze seal and a freeze clamp which overcomes the disadvantages of the prior art.

It is another object of the present invention to provide a freeze seal and freeze clamp which is easy to install and remove.

It is still another object of the present invention to provide a freeze seal and freeze clamp which is a reliable pressure seal and clamp regardless of cable construction, diameter, geometry or surface condition.

It is yet another object of the present invention to provide a freeze seal and freeze clamp which is a universal seal that conforms directly to the outer layer of the cable regardless of cable size, construction, or surface condition.

It is a still further object of the present invention to provide a freeze seal and freeze clamp that provides a force capable of restraining the cable from sliding through the seal.

It is another object of the present invention to provide a freeze seal and freeze clamp which does not damage or degrade the performance of the cable.

It is still another object of the present invention to provide a freeze seal and freeze clamp which will operate on cables at the free ends or in mid-span, that is, the pressure freeze seal and freeze clamp can be modified to a split design that is capable of capturing the cable anywhere along the length of the cable, for example, for local pressure testing of a repeater or splice housing in the center or mid-span of a long cable on a factory floor.

In accordance with one aspect of the present invention, a freeze seal for testing and qualifying cables and components connected to the cable includes a pressure vessel having the cable and the component to be pressure tested disposed in the pressure vessel with at least one part of the cable extending out of one or both ends of the pressure vessel. A freeze jacket surrounds one or both ends of the pressure vessel and defines an annular freeze seal area about one or both ends of the pressure vessel. A liquid supply means is connected to the pressure vessel for supplying a liquid under pressure such that the liquid flows into the pressure vessel surrounding the cable and the component to be tested. A freezing means is connected with the freeze jacket for supplying a freezing material to the annular freeze seal area, the freezing material having a temperature sufficient to freeze the liquid in the annular freeze seal area such that the frozen liquid forms a pressure freeze seal at one or both ends of the pressure vessel.

The freezing means can include a fluid that is conducted into the annular freeze seal area. In another method, dry ice may be placed in the annular freeze seal area.

In accordance with another aspect of the present invention, a freeze seal for testing of equipment and cables, includes a pressure vessel having the equipment to be tested and the cables therein, with at least one cable section extending out of the end of the pressure vessel. An extension tube is mounted adjacent to at least one end of the pressure vessel and is in open communication with the pressure vessel, with the at least one cable section extending from the pressure vessel out of the extension tube. A freeze jacket surrounds the extension tube and is spaced from the respective extension tube so as to define an annular freeze seal area therebetween. Liquid supply means is connected with the pressure vessel for supplying a liquid under pressure such that the liquid passes to an annular freeze seal area in the extension tube surrounding the cable. Freezing means is connected with the freeze jacket for supplying a freezing material to the annular freeze seal area, the freezing material having a temperature sufficient to freeze the liquid in the annular freeze area such that the frozen material forms a pressure freeze seal.

The freezing material may be of any type which is capable of providing the desired freezing and may include, for example, carbon dioxide, dry ice, or a cyrogenic fluid. The liquid supply means includes a delivery system for supplying the liquid into the freeze jacket under pressure.

The present invention is also directed to a freeze clamp wherein the freeze clamp provides a clamping force which clamps a cable or other element to be clamped and enables application of a tension force to pull or lift the cable or other element in various applications such as manipulating an undersea cable.

The above and other objects, features and advantages of the invention will become readily apparent from the following detailed description thereof which is to be read in connection with the accompanying drawings.

DESCRIPTION OF PREFERRED EMBODIMENTS

Figure 1:
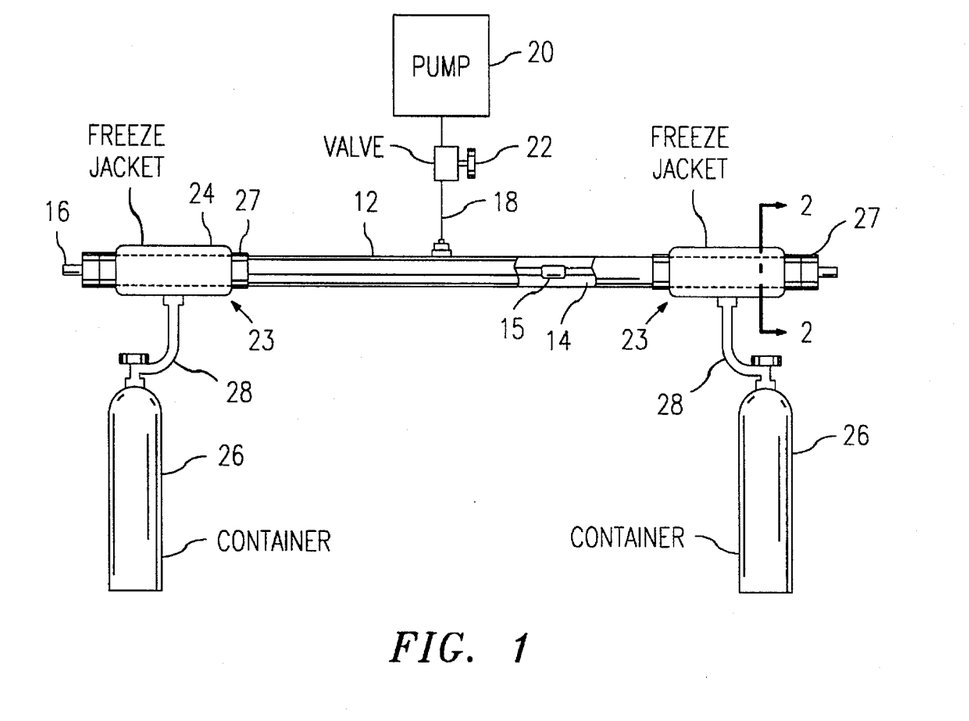
FIG. 1 is an elevational view, partly broken away, showing a freeze seal according to one embodiment of the invention.
Figure 2:
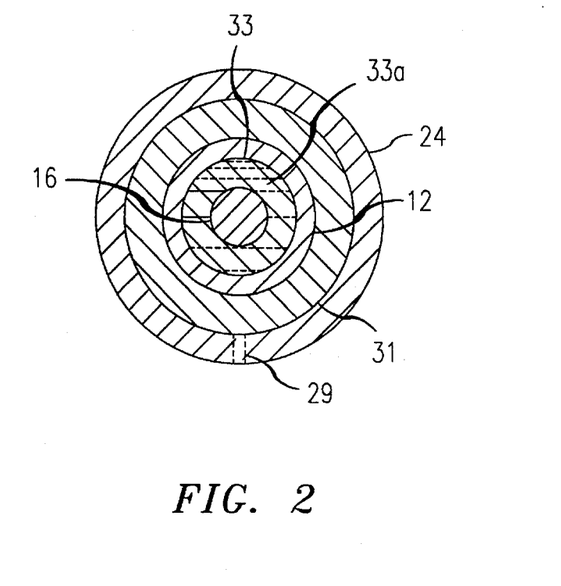
FIG. 2 is a sectional view taken along the line 2—2 in FIG. 1.

Referring to the drawings in detail, and initially to FIGS. 1 and 2 thereof, a portable pressure vessel facility includes a pressure vessel 12 in the form of a pipe or tube and preferably made of steel. Pressure vessel 12 includes an inner chamber 14 for containing a hardware component 15 which is connected to cable 16. The cable 16 extends within chamber 14 and exits at opposite ends of pressure vessel 12. By way of example, the pressure vessel 12 may have a length of ten feet while opposite ends of the cable 16 extending out of pressure vessel 12 are wound on respective reels (not shown).

A conduit connection 18 is connected to pressure vessel 12 and is in communication with chamber 14. A pump 20 is connected to conduit 18 to supply water or other liquid under pressure to chamber 14. A valve 22 is preferably connected with the conduit to control the flow of liquid therethrough and/or to control the pressure of liquid.

Two pressure vessel cable seals 23 are mounted at opposite ends of pressure vessel 12 in surrounding relation thereto. Each cable seal 23 includes a freeze jacket 24 which is disposed about the outer periphery of the pressure vessel 12. The freeze jacket 24 is made of one or more layers of a fabric material and insulating material and is wrapped around the pressure vessel and secured in place by fastening means (not shown) such as Velcro in a manner resembling application of a blood pressure cuff to a person's arm when taking a blood pressure reading. The longitudinal ends of the freeze jacket 24 are tightly secured to the pressure vessel by fastening means such as by tape 27. Alternatively, other securing means such as string or rope may be used. A conduit 29 is provided through the freeze jacket 24 to allow a freeze material to pass into the annular space 31 between the freeze jacket 24 and the outside of the pressure vessel 12 as will be further described. A pressurized container 26 of a freezing material, such as liquid carbon dioxide, is connected to each freeze jacket 24 through a suitable conduit 28 to supply liquid carbon dioxide to the annular space 31 between the inner surface of freeze jacket 24 and the outer wall of pressure vessel 12. As pressurized liquid of carbon dioxide is throttled into the annular space 31 between the freeze jacket 24 and the pressure vessel 12 and a portion of it flashes to gas while the remainder solidifies into dry ice in the annular space 31.

The advantages of using a fluid such as carbon dioxide are that it does not require special venting to the atmosphere, it can be used outside of pressure vessel 12, there is low local power required and there is a mechanical simplicity due to its self-pressurizing characteristics.

Of course, freezing means other than liquid carbon dioxide can be used. For example, a refrigerant system using a compressor, heat exchanger and condensate pump can be used. Alternatively, a cryogenic liquid can be pumped to the freeze jackets 24, thereby using a liquid/gas phase change to absorb the heat of vaporization. Still further, a thermoelectric cooling system can be used. In addition, dry ice may be manually placed between the freeze jacket 24 and the pressure vessel 12 with the dry ice being retained in place by the freeze jacket 24.

In basic operation, the hardware component 15 and associated cable 16 to which hardware component 15 is connected is placed in pressure vessel 12. A temporary waterblock is installed in the annular space 33 between the cable 16 and the pressure vessel 12 at the longitudinal end of the pressure vessel 12. The temporary water block may be clay, rubber or other similar material which may be formed into different shapes at ambient temperature. Chamber 14 of pressure vessel 12 is then filled with water (not under pressure). Carbon dioxide from supply tank 26 is throttled into the freeze jackets 24, thereby forming dry ice in the annular space 31 by using the heat of vaporization. The water in the annular space 33 within that portion of pressure vessel 12 surrounded by cable seals 23 and in surrounding relation to cable 16, freezes into ice, thereby creating ice 33a and resulting in freeze seals thereat.

Pressure vessel 12 is then pressurized by pump 20. Because of the freeze seals that are formed, liquid no longer can escape from chamber 14. Specifically, the ice 33a in annular chamber 33 exerts a radial inner compressive force on cable 16 and an outer radial force on pressure vessel 12 during the final stage of ice formation. This is due to the expansion of the ice 33a during freezing. The adhesion of the ice 33a to the walls of pressure vessel 12 and to cable 16 contributes to the sealing. Further, forces generated by the ice 33a can be controlled by controlling the ice formation.

At the conclusion of the testing, the pressure is released inside pressure vessel 12, and freeze jackets 24 are removed. After the ice 33a melts, the water is drained and the hardware component 15 and cable 16 are removed from pressure vessel 12. The freeze jacket 24 may be heated if quick removal of the ice seal is desired.

Figure 3:
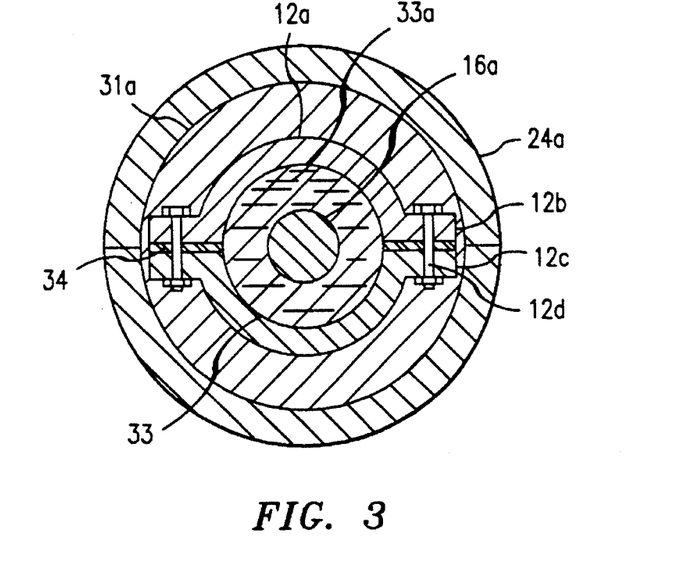
FIG. 3 is a sectional view taken in a manner similar to that of FIG. 2 but showing an alternative embodiment in which the pressure vessel which is formed in two halves with the two halves being fastened by fastening means.

FIGS. 3 shows a further embodiment wherein a metal pressure vessel 12a is made up of two halves 12b and 12c which are joined together by fastening means such as nuts and bolts 12d. A resilient gasket 34 is disposed between the two halves 12b, 12c. A cable 16a extends through the pressure vessel 12a. FIG. 3 further shows the freeze jacket 24a, the freeze material in annular space 31a, and the ice 33a in annular space 33. These parts are Similar to the corresponding parts in the embodiment of FIGS. 1 and 2 with letter subscripts have been added to the numerals to identify the corresponding similar parts. With this construction the two halves 12b, 12c can be separated in order to receive an intermediate part or mid-span part of an elongated cable 16a which may be coiled on coils.

Figure 4:
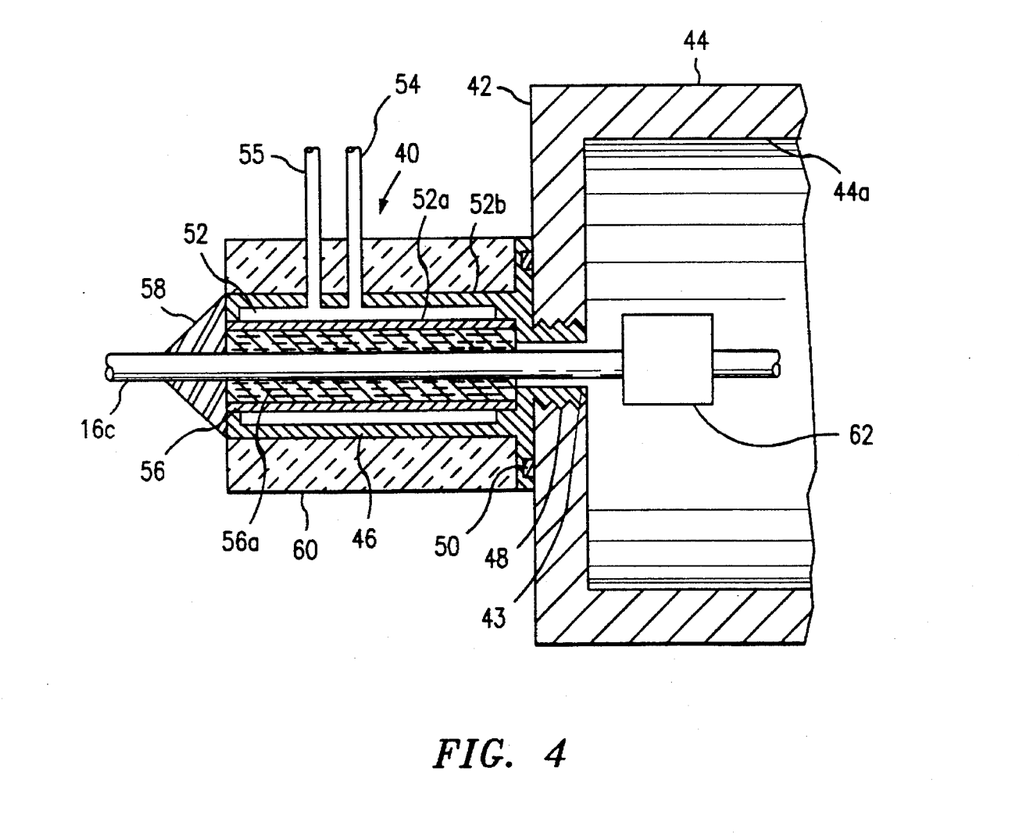
FIG. 4 is an elevational view of another embodiment of the invention wherein the freeze seal is mounted on a pressure vessel.

The freeze seal according to the present invention will operate with different configurations and in different environments. For example, in the arrangement of FIGS. 1 and 2, the freeze seals 23 are disposed in surrounding relation to pressure vessel 12. However, in another embodiment as shown in FIG. 4, freeze seal 40 is disposed at an end wall 42 of a pressure vessel 44. The freeze seal 40 includes a freeze seal structure 46 mounted on pressure vessel 44 by mounting means such as the threads 48 on the seal structure 46 engaging the mating threads on the pressure vessel 44, a seal 50 of resilient material being provided between the seal structure 46 and the pressure vessel 44. The seal structure 46 is made of metal and has a freeze chamber 52 having an inner wall 52a spaced from an outer wall 52b and end walls. A conduit 54 supplies freeze material to the freeze chamber 52 while conduit 55 is a vent or a return.

An annular freeze space 56 between the inner wall 52a and a cable 16c is in open communication with inner chamber 44a of pressure vessel 44 via passage 43 so as to fill with liquid, e.g. water, that is pumped into inner chamber 44a. A seal such as a split rubber cone 58 is positioned over cable 16c at the free end of seal structure 46 and functions as a liquid seal, as insulation and to center cable 16c. A foam insulation 60 surrounds the seal structure 46 to further insulate the freeze seal.

In operation, a hardware component 62 and an associated cable or cables 16c that are to be tested are placed in the pressure vessel 44 with the cable 16c extending through the seal structure 46. Pressure vessel 44 is then filled with water (not under pressure) via a conduit (not shown), and a cryogenic liquid is introduced into seal chamber 52 via conduit 54. The liquid in annular freeze space 56 freezes into ice 56a, thereby creating an ice seal in the annular freeze space 56. The pressure vessel 44 is then pressurized. Because of the ice 56a that is formed between the cable 16c and the seal structure 46 no liquid escapes from chamber 44. At the conclusion of the testing, the pressure is removed from pressure vessel 44 and after the ice 56a melts, the water is drained and the hardware component 62 and cable 16c are removed from the pressure vessel 44.

Figure 5:
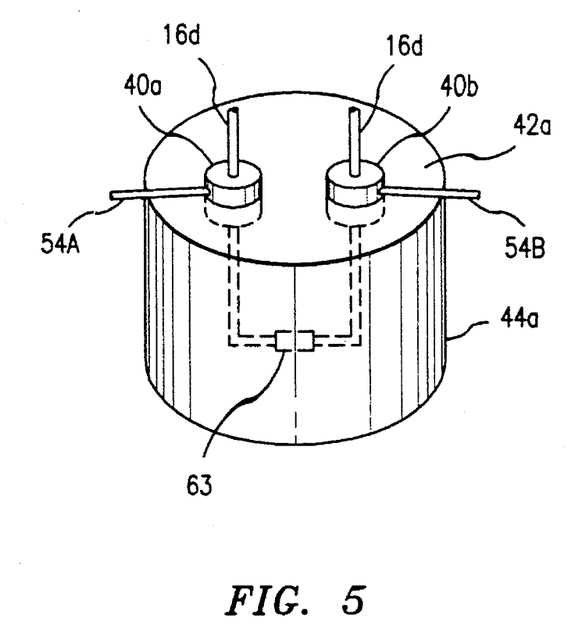
FIG. 5 is a schematic and perspective view showing two freeze seals mounted on a pressure vessel.

FIG. 5 is a schematic view showing another embodiment wherein a hardware component 63 connected to a cable 16d is tested in a pressure vessel 44a. Two freeze seals 40a and 40b, such as the freeze seal 40 shown in FIG. 4, are mounted on the end wall 42a of the pressure vessel 44a to thereby simultaneously seal two mid-span portions of the cable 16d. The pressure vessel 44a is pressurized to test the component 63 as the freeze seals 40a, 40b seal the cable 16d which passes outside of the pressure vessel 44a.

Figure 6:
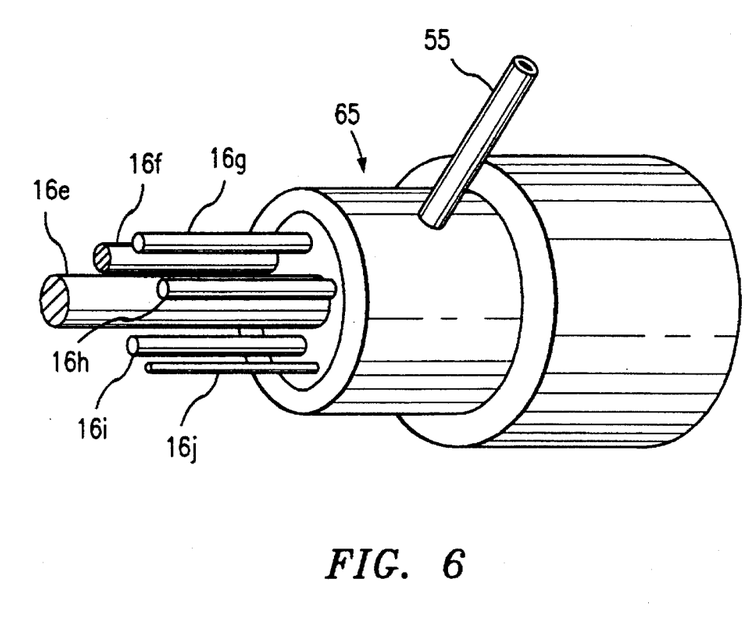
FIG. 6 shows an alternate embodiment wherein a plurality of different size conductors are sealed within the freeze seal.

Any number of cables of various diameter, cross sectional configuration, geometric shape and material composition may be freeze sealed according to the present invention. For example the embodiment of FIG. 6 shows a freeze seal 65 which simultaneously freeze seals a plurality of cables of various diameters as indicated at 16e through 16j.

Returning now to the embodiment of FIGS. 1 and 2, an undersea cable pressure test was performed using this embodiment. In this test, the sample cable 16 was placed in pressure vessel 12 which was then filled with water. Thermocouples placed on the cable 16 were used to measure the temperature and length of the ice seal. Carbon dioxide was injected into freeze jacket 24, thereby creating dry ice (−110° F.). The dry ice in contact with the exterior of the pressure vessel 12 created an ice seal 33a eight inches long in about 15 minutes. After the ice seal was established, the pressure was increased in 1000 psi increments up to a minimum of 5000 psi (maximum of 6200 psi). After a dwell time of 5 minutes, the pressure was reduced to 4,000 psi and the jacket 24 and dry ice were removed. The ice or freeze seal was then allowed to fail under pressure. The time and temperature of the ice at failure was recorded. To test for plastic deformation, the outside diameter along the length of pressure vessel 12 was recorded in six inch increments before and after each test.

The tests included the following samples:

a) No cable was used.

b) A fifteen foot length of AT&T SL Deep Water undersea cable was tested in a 1.5 inch and 2.5 inch pressure vessel 12. The cable had an outside diameter of 0.8 inch with an outer jacket of polyethylene. The diameter of the cable was measured along the length before and after each test, in order to determine if the freeze seal caused permanent deformation to the cable.

c) A fifteen foot length of AT&T SL single-armor undersea cable was tested in the 2.5 inch diameter pipe. The cable had an outside diameter of 1.5 inches, with an outer layer of tar and jute. In one test, the cable was used, as is, and in another test, one end of the cable was prepared by removing the tar and jute, exposing the armor-wires. The bedding under the armor-wires was then removed. This test was conducted in order to determine if a grossly damaged cable could be sealed using the freeze seal.

d) An optic fiber was used.

The results of the pressure tests are represented by the following table 1:

TABLE 1

| Pipe ID (inches) | Cable Type | Max. Pressure (psi) | Time to Failure (after jacket removal) | Temperature | Observation |
| --- | --- | --- | --- | --- | --- |
| 1.5 | no cable | 6200 | 21 minutes | | no yielding |
| 1.5 | SL Deep Wtr | 6200 | 130 minutes (jacket was not removed) | −18° F. | no damage |
| 2.5 | no cable | 6200 | 35 minutes | | no yielding |
| 2.5 | SL Deep Wtr | 6200 | 43 minutes | −24° F. | no damage |
| 2.5 | SL Single Arm. | 6200 | 30 minutes | −20° F. | no damage |
| 2.5 | SL Single Arm. Jute & bedding removed | 6200 | 30 minutes | −20° F. | no damage |
| 1.5 | Optic Fiber | 5000 | Did not test to failure | | no damage |
| 2.5 | Optic Fiber | 5000 | Did not test to failure | | no damage |

The undersea cable pressure test results indicate that the SL Deep Water (0.8 inch diameter, polyethylene jacket) cable, was successfully tested to 6200 psi using the freeze seal in both the 1.5 inch and 2.5 inch pressure vessel 12. There was no appreciable change in the outside diameter of cable 16 after any of the tests. This is an indication that the compressive or clamping force of the ice does not damage the cable. The outside diameter of pressure vessel 12, in the area of the freeze seal, did not increase after the testing, indicating that the expansion of the ice did not cause permanent yielding of the walls of pressure vessel 12. The outside diameter along the length of pressure vessel 12 did not increase, indicating that repeated internal hydraulic pressures of 6,200 psi did not cause permanent yielding.

The SL single armor (1.5 inch diameter, tar and jute coated) cable was successfully tested to 6,200 psi in the 2.5 inch pipe. After the seal was established, the pressure was gradually increased to 1,000 psi. It was noticed that the pressure dropped slightly over several minutes. After the initial pressure drop, the pressure was increased back to the 1,000 psi without any further loss in pressure. After each 1000 psi increase up to the maximum 6,200 psi the same sequence of events was observed. The pressure loss that was present in the single-armor cable may be due to the way in which the cable was tested. The dry cable was placed in pressure vessel 12 and the ice or freeze seal established within ten minutes. Water may not have been able to penetrate under the tar and Jute coating within the ten minute seal installation period. Water could have been forced into the dry voids under the tar and Jute jacket during the pressurization, causing the pressure drop. When the liquid water comes into contact with the −30° F. freeze seal boundary the water is frozen, thereby reestablishing the pressure seal. This type of action can be thought of as a "self healing" attribute of the freeze seal.

Figure 7:
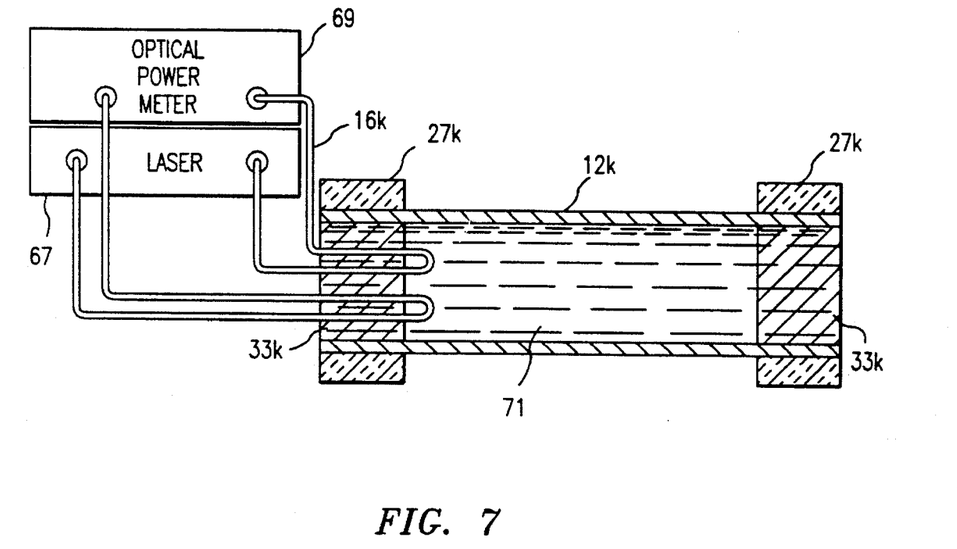
FIG. 7 is a view showing a test arrangement for evaluating the freeze seal when used with optical fibers.

In addition to the above testing, a further fiber optical pressure test was performed on optical fibers which have a very small diameter, for example, in the order of 0.01 inches average diameter. In this test, as shown in FIG. 7, two optical fibers 16k were placed in pressure vessel housing 12k. Optical losses for both fibers 12k were recorded continuously during ice formation, vessel pressurization, de-pressurization and ice removal. Three pressure tests were conducted to a maximum pressure of 5,000 psi.

The first optical fiber pressure test used a Dow Corning 100/140 Multimode fiber and an AT&T Depressed Clad single mode fiber installed in the pressure vessel shown in FIG. 7. As shown therein, the first optical fiber pressure test was run by simply looping optical fibers 16k in a pressure vessel housing 12k and forming freeze seals 33k at opposite ends thereof by means of freeze jackets 27k. Optical fibers 16k extending from pressure vessel 12k were connected at one end to a laser 67 which transmitted light through the optical fibers 16k and at their opposite ends to an optical power meter 69 which measured the light output therefrom. Water 71 under pressure was pumped into pressure vessel 12k between the ice seals 33k.

Figure 10:
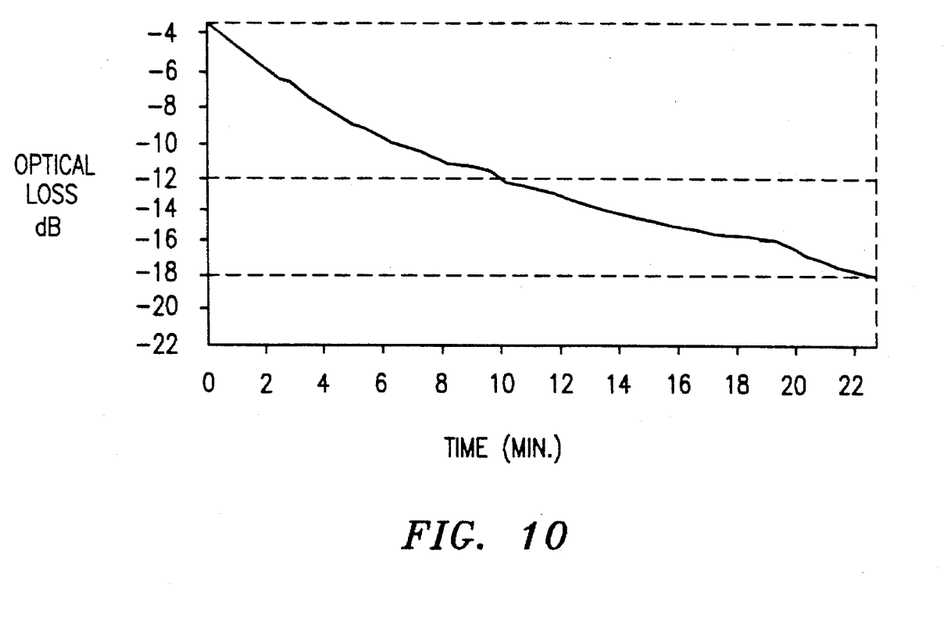
FIG. 10 is a graphical diagram of the results of optical loss versus time for the pressure test used in FIG. 7.
Figure 11:
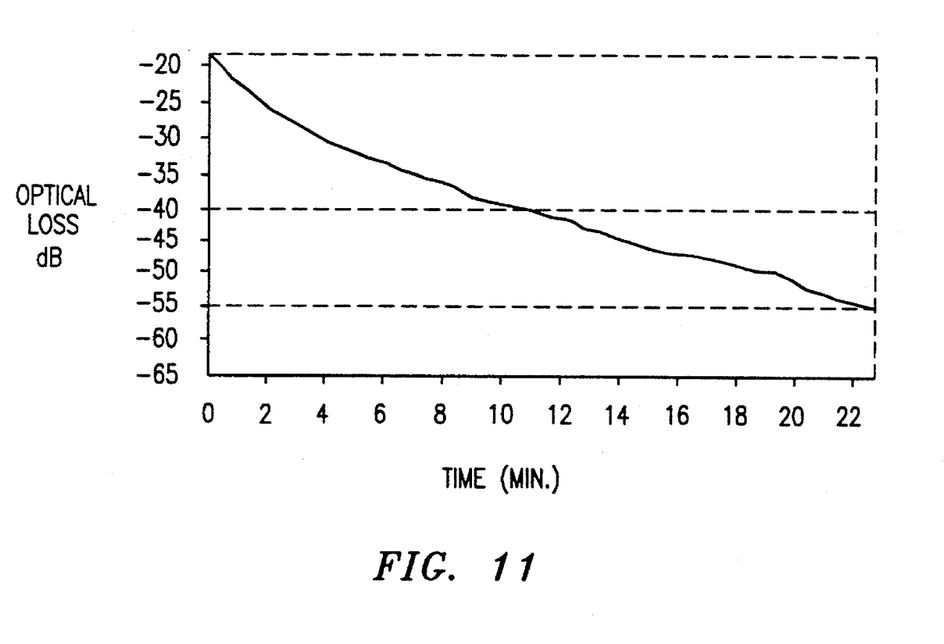
FIG. 11 is a graphical diagram of additional results of optical loss versus time for the pressure test used in FIG. 7.

The results of this first test, as shown in FIGS. 10 and 11, indicate that the optical loss steadily increases over time, starting to increase during the ice formation and continuing until the end of the pressure test. Optical measurements were taken before the ice seals were installed, during ice seal installation, and during pressurization. The optical loss returned to the pretest values after 24 hours. It was concluded that the fibers 16k could not be placed into the freeze seal unprotected because of unacceptable optical loss.

Figure 8:
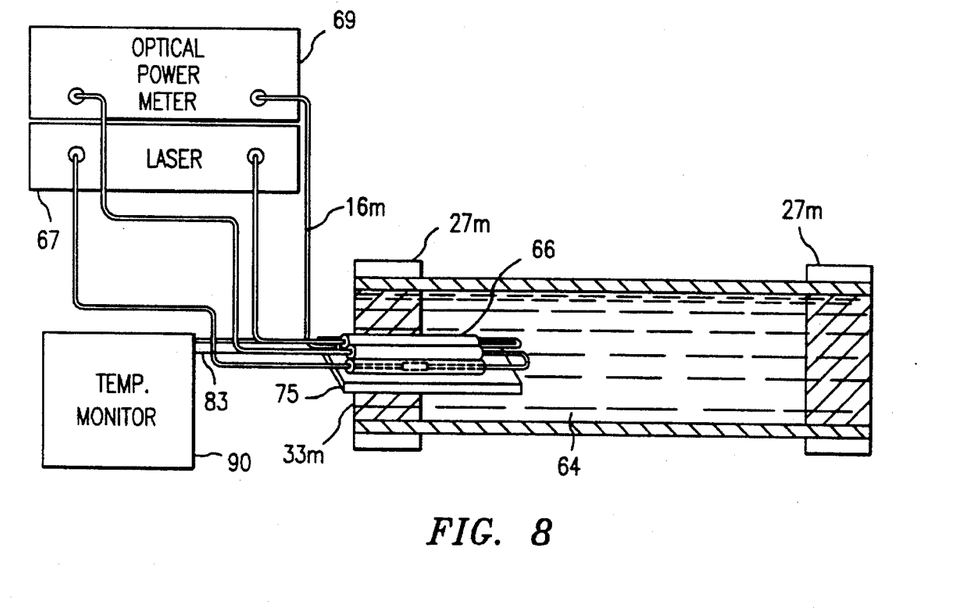
FIG. 8 is a view similar to FIG. 7 but wherein the optical fibers in the freeze seal are disposed in tubes.
Figure 9:
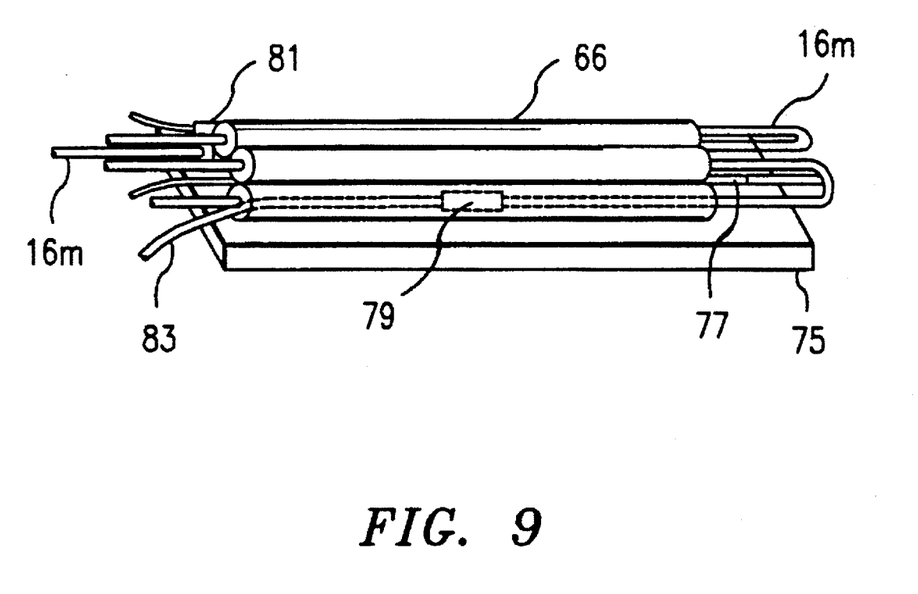
FIG. 9 is a perspective view of a portion of FIG. 8.

As a result of poor optical performance found in the first test, a second optical fiber pressure test was performed, as shown in FIGS. 8 and 9, using the same Dow Corning and AT&T fibers inserted into ⅛ inch internal diameter stainless tubes 66.

In this second test, four tubes 66 were used, having optical fibers 16 m running through the centers thereof, with the four tubes 66 being attached to a ¼" thick×1" wide×15" long metal strip 75 by fastening means such as a common wire tie (not shown). Three temperature sensors 77, 79 and 81 were mounted to metal strip 75 to supply signals corresponding thereto via connecting conductors 83 to a temperature monitor 90 which monitored the ice temperature.

Figure 12:
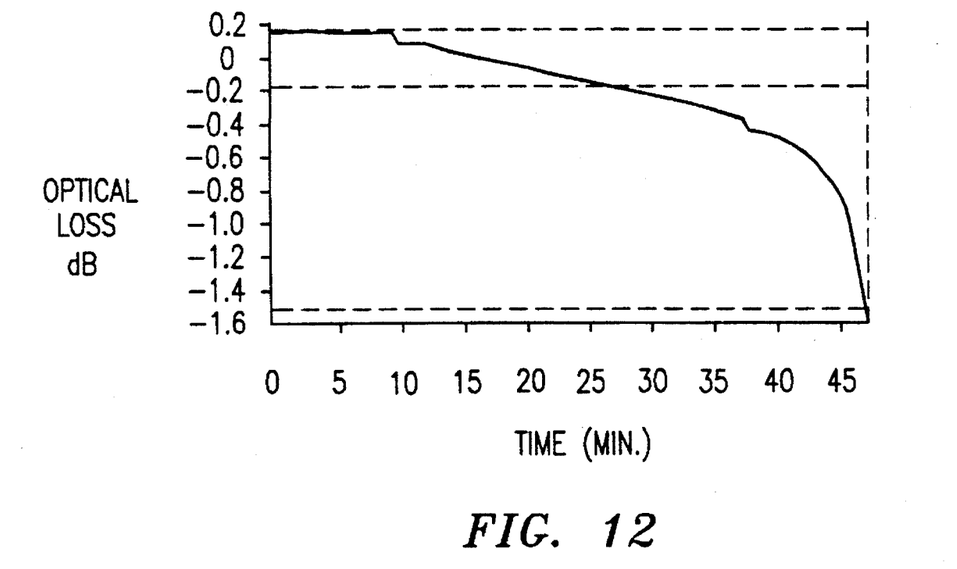
FIG. 12 is a graphical diagram of the results of optical loss versus time for the pressure test used in FIGS. 8 and 9.
Figure 13:
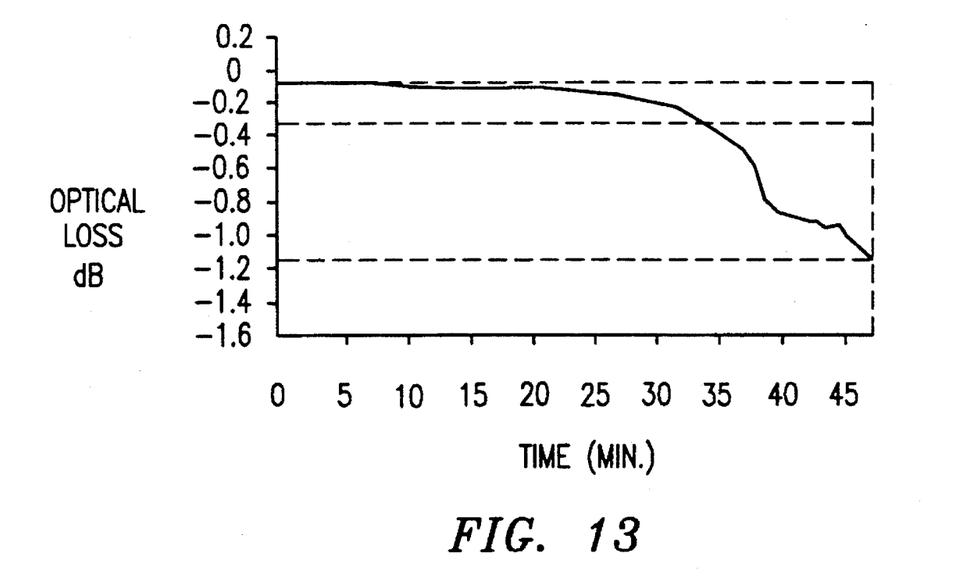
FIG. 13 is a graphical diagram of additional results of optical loss versus time for the pressure test used in FIGS. 8 and 9.

The results of the second optical test indicated that there was little optical loss during the first 10 minutes of the test, as shown in FIGS. 12 and 13. After 10 minutes, there was an abrupt increase in optical loss. A careful review of the temperature monitoring equipment indicated that at 10 minutes into the test, ice formed around one end of the protective tubes 66. Interaction of the ice at the end of the tube/fiber interface could have resulted in increased optical loss. Again, optical measurements were taken before the ice seals were installed, during ice seal installation, and during pressurization.

Figure 14:
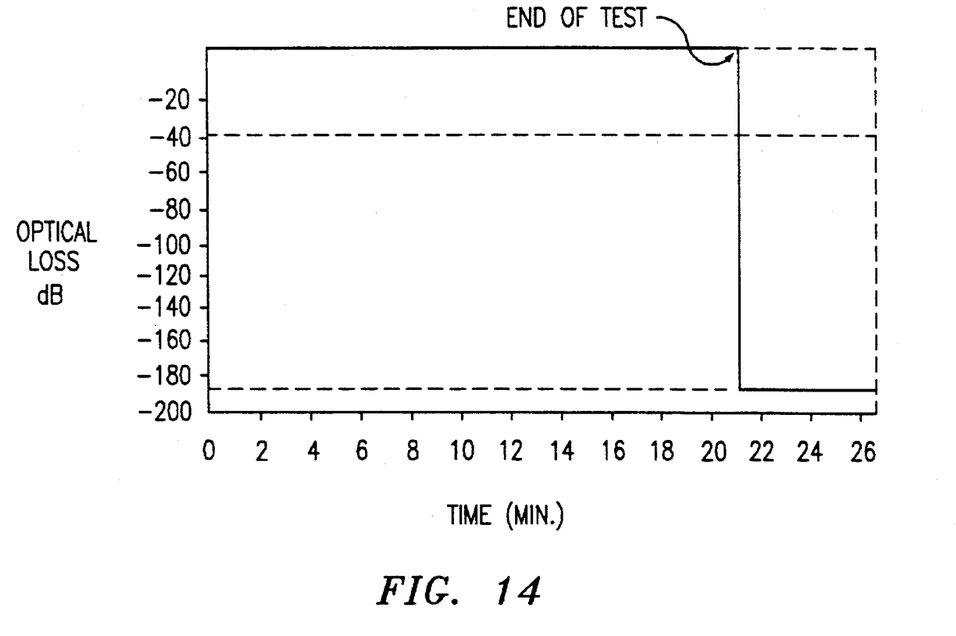
FIG. 14 is a graphical diagram of the results of optical loss versus time for a modified pressure test used in FIGS. 8 and 9.
Figure 15:
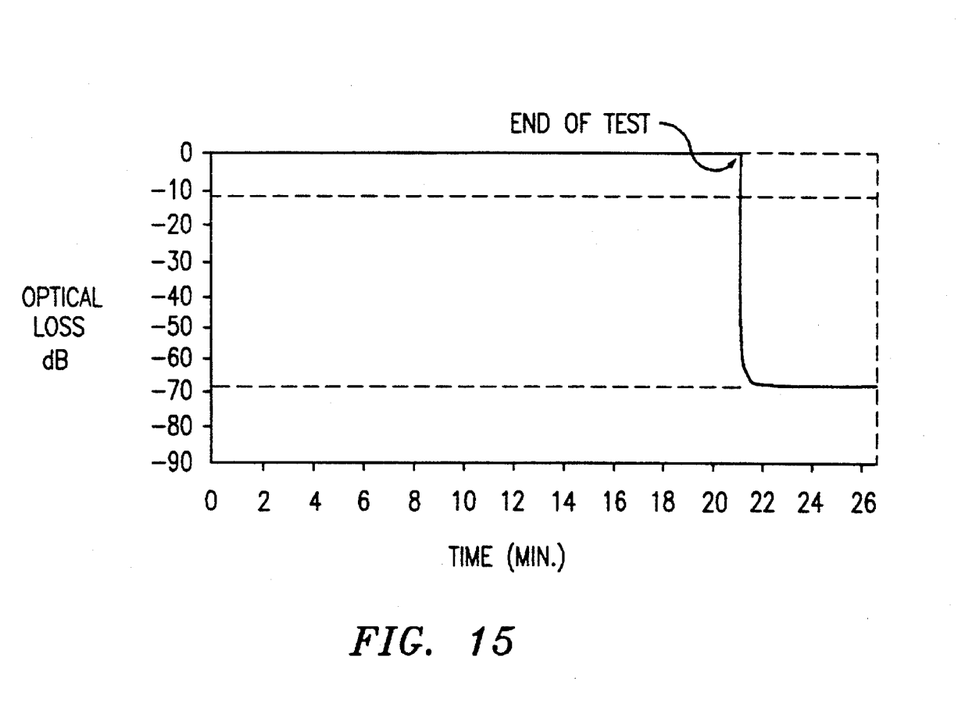
FIG. 15 is a graphical diagram of additional results of optical loss versus time for the modified pressure test used in FIGS. 8 and 9.

Improvements in the optical performance of the second test resulted in changes in the test set-up for a third optical fiber pressure test. Specifically, the fibers were inserted into 0.032" internal diameter brass tubes (not shown). The brass tubes were then inserted into the ⅛ inch ID stainless steel tubes 66 and installed into the test setup shown in FIGS. 8 and 9. The protective tubes 66 were carefully positioned in the freeze seal, to ensure that ice would not form around the ends of tubes 66. Test results show extremely low optical loss during ice generation and during the pressure test, as shown in FIGS. 14 and 15. Again, optical measurements were taken before the ice seals were installed, during ice seal installation, and during pressurization.

Figure 16A:
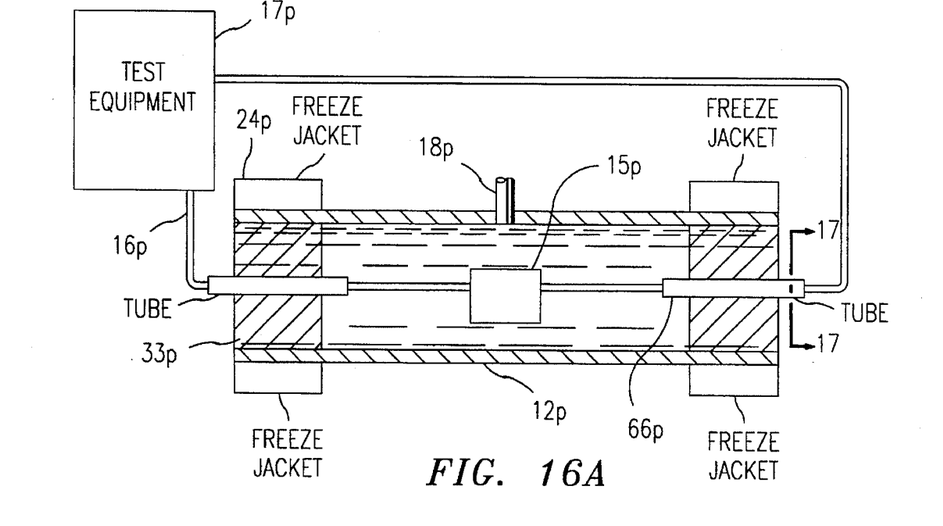
FIG. 16A is a cross sectional view of another embodiment showing a freeze seal used to seal an optical fiber.
Figure 17:
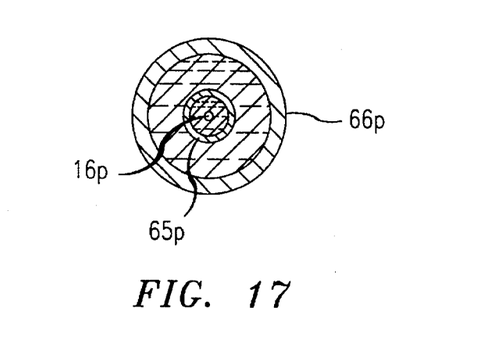
FIG. 17 is a sectional view taken along the lines 17—17 in FIG. 16.

FIGS. 16A and 17 show a further embodiment wherein an optical fiber 16p is connected to a component 15p to be pressure tested using test equipment 17p. The component 15p is disposed in a pressure vessel 12p and the optical fiber 16p extends out of both ends of the pressure vessel 12p. Freeze jackets 24p on the outside of each end portion of the pressure vessel 12p provide a freeze seal at both ends of the pressure vessel 12p. The optical fiber 16p extends through an inner tube 65p (shown in FIG. 17 only) which in turn extends through an outer tube 66p. The tubes 65p, 66p are sufficiently long to extend longitudinally beyond the longitudinal ends of the ice 33p which forms the seal to ensure that ice does not form around the ends of the tubes 65p, 66p. After the freeze seals are established, the vessel 12p is pressure tested with fluid supplied via conduit 18p to perform the pressure testing.

Instead of the optical fiber 16p extending out of both ends of the pressure vessel 12p, it may extend out of only one end. Also only one optical fiber 16p may be connected to the component 15p instead of the two shown in FIG. 16A.

Figure 16B:
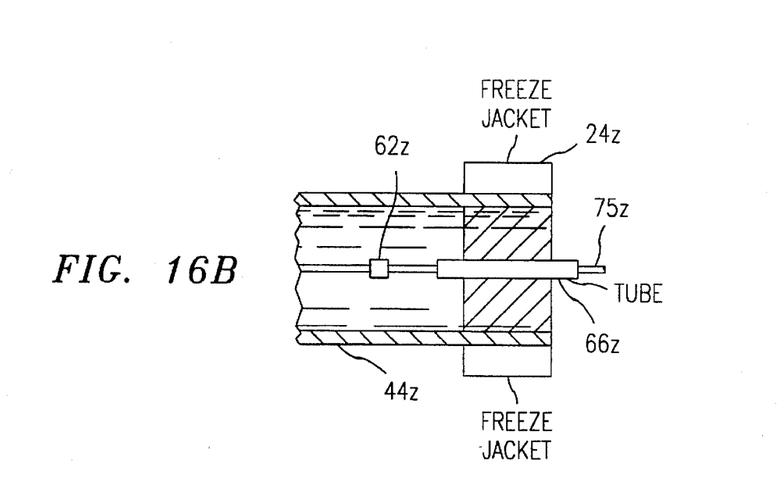
FIG 16B is a partial cross sectional view of another embodiment in which the freeze seal shown in FIG. 16A is used with pressure vessel in FIG. 4.

FIG. 16B shows another embodiment in which the freeze seal of 16A is used with a pressure vessel 44z, such as shown in FIG. 4, in which a hardware component 62z is pressured tested. The freeze seal of FIG. 16B included a freeze jacket 24z, inner tube 65z and an elongated element 75z. The inner tube 65z is not shown in FIG. 16B but would be the same as inner tube 65p shown in FIG. 17.

The optical fibers may comprise glass either coated or uncoated. An example of the diameter of the optical fiber is in the order of 0.01 average diameter.

A tension test was performed to determine the cable clamping force generated by the freeze or ice seal. If the freeze seal can generate enough clamping force to prevent the cable from being forced out of pressure vessel housing while under pressure, the freeze seal can act as a combination seal and clamp.

Careful observations of the ice formation revealed that the ice is formed in thin layers starting from the pipe wall in the region under freeze jacket. As the thin layers freeze, expansion of the ice displaces water at the water/ice boundary. The final layer to freeze traps a small amount of water next to the cable/ice boundary. Expansion of this water during the freezing process produces a cable clamping force. By controlling the amount of "trapped" water next to cable it may be possible to adjust the clamping force generated by the ice. Adhesion of the ice to the cable wall also add to the shear resistance.

The first tension test determined the clamping force generated by the freeze seal during a "normal" freeze process. The second "modified" tension test increased the clamping force of the seal by altering the ice formation process within the seal. Specifically, the longitudinal ends of the seal were first frozen, trapping water in the central longitudinal portion of the seal such that when the trapped water in the central longitudinal portion subsequently started to freeze, an increased clamping force resulted because there was no space for the freezing water in the trapped central longitudinal portion to expand.

Figure 18:
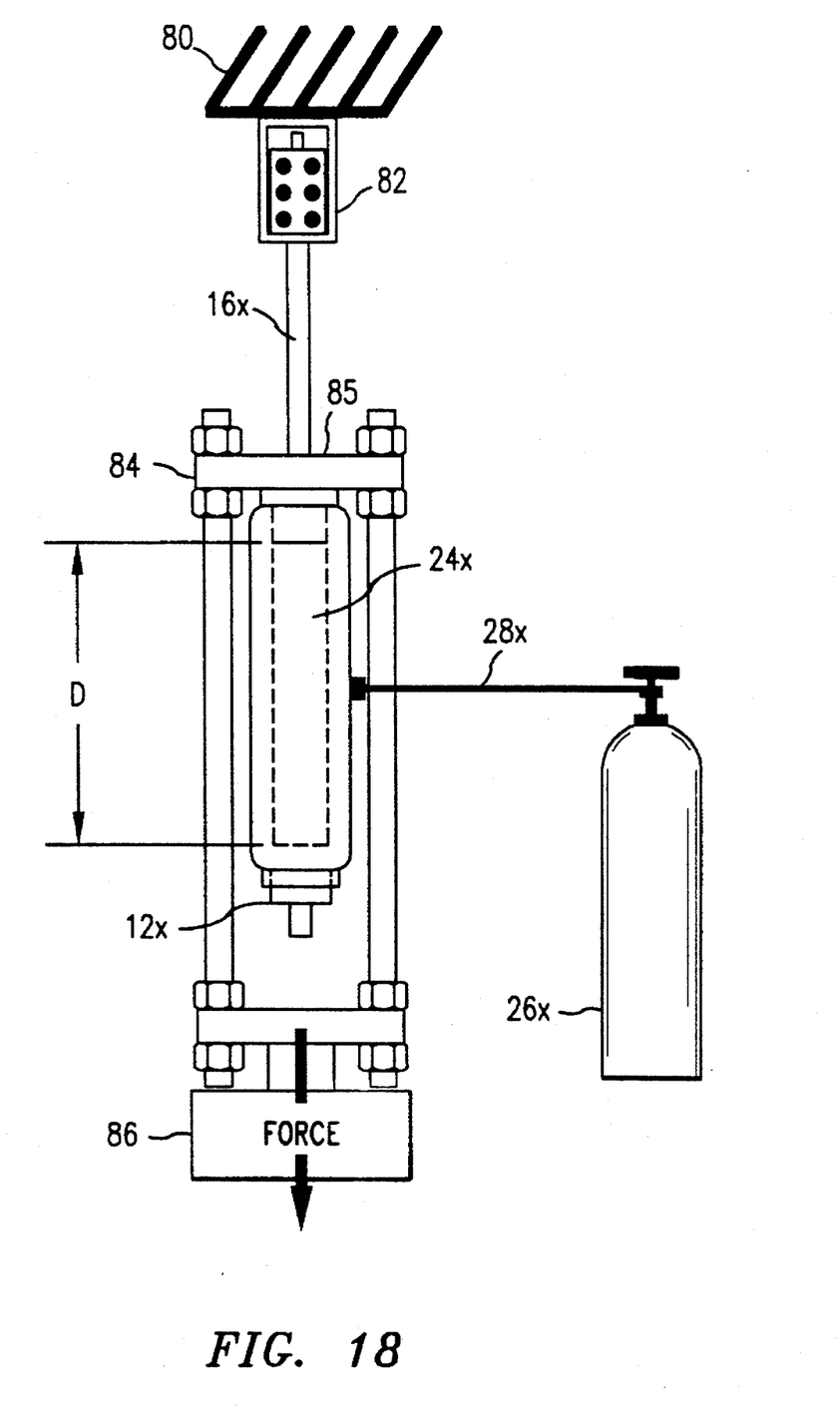
FIG. 18 is an elevational view showing a freeze seal used as a clamp.

The sample cables were installed in the test setup shown in FIG. 18. Specifically, one end of cable 16x was fixed to a support 80 by a clamp 82, while the opposite end of cable 16x extended through the pressure vessel 12x which was surrounded by a freeze jacket 24x, as in FIG. 1. A frame 84 having a crosshead 85 abutted against the upper end of pressure vessel 12x had a pulling force applied thereon by pulling means 86 connected thereto. The force that was applied was in a direction away from support 80. As in the embodiment of FIG. 1, an ice or freeze seal was formed between pressure vessel 12x and cable 16x, the length D of the freeze seal being approximately 8.0 inches.

Each sample was pull tested to failure or a maximum of 15,000 pounds. The results of the tests are shown in the following Table 2. Careful observation of the outer jacket of cable 16x was made before and after each pull test to determine if damage occurred during the test.

TABLE 2

| Pipe ID (inches) | Cable Type | Max Tension (psi) | Freeze method | Observation |
| --- | --- | --- | --- | --- |
| 1.5 | SL Deep Water 0.8" Dia. Poly Jacket | 1250 | Normal | no damage |
| 1.5 | SL Deep Water | 5010 | Modified | no damage |
| 2.5 | SL Deep Water | 1200 | Normal | no damage |
| 2.5 | SL Deep Water | 5500 | Modified | no damage |
| 2.5 | SL Single Armored Jute Jacket 1.5" Dia. | 15000 | Normal | no damage |

The results of the tension test reveal that the freeze seal can act as the sole cable restraint during most applications of high pressure testing. Thus, testing of the freeze seal has demonstrated that it is a universal, easy to install, high pressure seal that is unaffected by cable construction, diameter or surface condition. The freeze seal has a simple robust design that can be incorporated into existing pressure vessel systems.

Further, "off the shelf" pipes can be used as the pressure vessel housing for high pressure testing of cable systems and undersea components.

Figure 19:
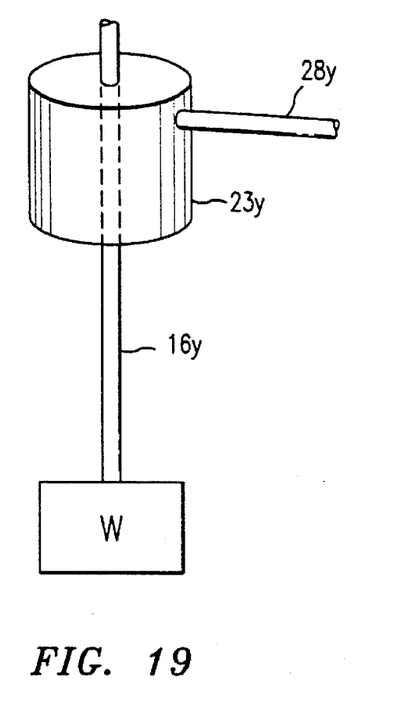
FIG. 19 is a perspective view showing a freeze seal used as a clamp.

FIG. 19 shows a freeze seal 23y used as a clamp for clamping an elongated element 16y which may be a non-electrical component such as a rope, rod or other structural member. The elongated element 16y may be used for various purposes for example for supporting a weight W or for providing tension or compression on a structure.

Figure 20:
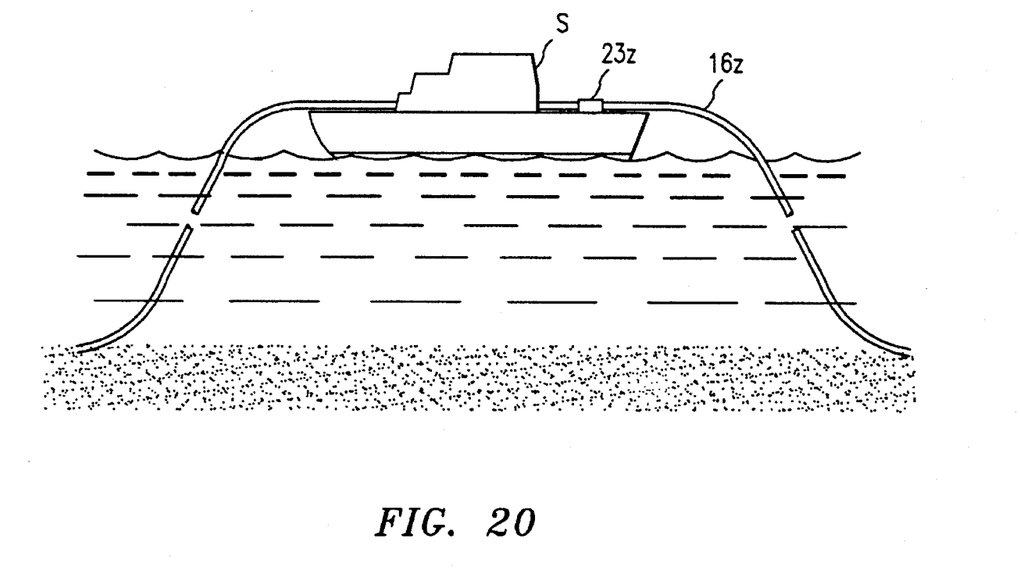
FIG. 20 is a schematic view showing a freeze seal and freeze clamp used on a ship for handling undersea cable.

FIG. 20 shows a freeze seal and/or a freeze clamp 23z used on a ship S. The freeze clamp 23z can be used on the ship as a clamp for clamping an undersea cable 16z as it is raised from and/or lowered to the ocean floor. Also the freeze seal 23z can be used on the ship as a seal for pressure testing the cable 16z, pressure testing splices on the cable 16z and pressure testing components connected to the cable 16z.

Although water is mentioned as the pressurizing fluid for the pressure vessel 12, other fluids may also be used.

The freeze seal may also be incorporated into a temporary cable tensioning device that can replace the spelter socket (requires potting of the armor wires at the end of the cables) and Kelly Grips ("Chinese finger" device woven around the cable) in some applications.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What we claim is:

1. A freeze device for an elongated element comprising a pressure vessel having an interior and a passage means leading to said interior, said elongated element having one part extending through said passage means and another part disposed in said interior of said pressure vessel, freeze means between said one part of said elongated element and said passage means, said freeze means including a frozen material exerting a force inwardly against said one part of said elongated element and outwardly against said passage means by virtue of having been frozen in situ such that said frozen material thereby seals said elongated element in said passage means of said pressure vessel.

2. A freeze device according to claim 1 wherein said elongated element is selected from the group consisting of cables, wires and fibers.

3. A freeze device according to claim 1 wherein there are a plurality of said elongated elements such that said freeze means simultaneously seals said plurality of elongated elements in said pressure vessel.

4. A freeze device according to claim 3 wherein at least some of said plurality of elongated elements have different diameters.

5. A freeze device according to claim 1 wherein said pressure vessel is an elongated pipe.

6. A freeze device according to claim 1 wherein said frozen material comprises ice.

7. A freeze device according to claim 1 further comprising pressurizing means for introducing a fluid under pressure into said interior of said pressure vessel for subjecting said other part of said elongated element to pressure testing within said interior of said pressure vessel.

8. A freeze device according to claim 1 wherein said elongated element is a conductor, and further comprising a hardware component connected to said conductor, said component being disposed in said pressure vessel.

9. A freeze device according to claim 1 wherein said passage means and said pressure vessel include cooperable mounting means for mounting said passage means on said pressure vessel.

10. A freeze device according to claim 1 wherein said freeze means comprises a first elongated pipe disposed within a second elongated pipe, said elongated element passing through said first elongated pipe, said frozen material being disposed between said two pipes, between said first pipe and said elongated element, and between said second pipe and said passage means.

11. A freeze device according to claim 10 wherein said frozen material has a longitudinal length terminating at an inner end face within said pressure vessel and an outer end face terminating outside of said pressure vessel, said first and second pipes each having a longitudinal length greater than said longitudinal length of said frozen material.

12. A freeze device according to claim 11 wherein said first and second pipes each have an inner end portion which extends into said pressure vessel further than said inner end face of said frozen material, said first and second pipes each having an outer end portion which extends outside of said pressure vessel beyond said outer end face of said frozen material.

13. A freeze device for an elongated element comprising a pressure vessel having a first through passage spaced from a second through passage, an elongated element having a first part disposed in said first through passage and a second part disposed in said second through passage, first freeze means between said first part of said elongated element and said first through passage, said first freeze means including a first frozen material exerting a force inwardly against said first part of said elongated element and outwardly against said first through passage by virtue of having been frozen in situ such that said first frozen material thereby seals said first part of said elongated element in said first through passage, second freeze means between said second part of said elongated element and said second through passage, said second freeze means including a second frozen material exerting a force inwardly against said second part of said elongated element and outwardly against said second through passage by virtue of having been frozen in situ such that said second frozen material thereby seals said second part of said elongated element in said second through passage.

14. A freeze device according to claim 13 wherein said first and second freeze means each have longitudinal axes, said pressure vessel being an elongated pressure vessel having a longitudinal axis which is generally coincident with said axes of the first and second freeze means.

15. A freeze device according to claim 13 wherein said first and second freeze means each have longitudinal axes which are spaced from one another and which are generally parallel to one another.

16. A freeze device according to claim 13, further comprising pressurizing means for introducing a pressurized fluid into said pressure vessel.

17. A freeze device according to claim 13 wherein said elongated element is used with a device to be pressure tested, said device being disposed in said pressure vessel, said elongated element having a first portion which is connected to said device and which extends from said device to said first part of said elongated element, said elongated element having a second portion which is connected to said device and which extends from said device to said second part of said elongated element, and pressurizing means introducing pressurizing fluid into said pressure vessel to effect pressure testing of said device within said pressure vessel.

18. A clamping device for an elongated element comprising a clamping enclosure disposed about at least a part of said element, freeze means between said part of said elongated element and said enclosure, said freeze means including a frozen material exerting a force inwardly against said part of said element and outwardly against said enclosure by virtue of having been frozen in situ such that said frozen material thereby clamps said elongated element to said enclosure, and pulling means attached to said enclosure for pulling said enclosure such that pulling of said enclosure effects pulling of said elongated element.

19. A freeze device according to claim 18 wherein said conductor is a cable.

20. A method for clamping an elongated element comprising disposing a part of said elongated element in a clamping enclosure, introducing a freezable material into said enclosure, surrounding said part of said elongated element with said freezable material, freezing said freezable material in situ in said enclosure such that the frozen material exerts an inward force against said part of said elongated element and an outward force against said enclosure, clamping said part of said elongated element to said enclosure by said forces exerted by said frozen material and effecting tensioning between said enclosure and aid elongated element while said part of said elongated element is clamped to said enclosure.

21. A method according to claim 20 wherein said frozen material is ice.

22. A method according to claim 20 wherein said step of freezing said freezable material comprises utilizing carbon dioxide to effect said freezing.

23. A method according to claim 20 wherein said step of freezing said freezable material comprises utilizing dry ice to effect said freezing.

24. A method according to claim 20 wherein said step of freezing said freezable material comprises utilizing a cryogenic material to effect said freezing.

25. A method according to claim 20 wherein said elongated element is an underwater conductor which is adapted to be disposed under water during normal use, said conductor being placed under water by a ship, said conductor having a portion which is temporarily disposed on said ship as another portion of the conductor is being placed under water, further comprising utilizing the clamping of said part of said conductor to said enclosure on said ship for effecting clamping of said portion of said conductor which is temporarily disposed on said ship.

26. A method for sealing an elongated element comprising providing a pressure vessel having an interior and first through passage leading to said interior, disposing a first part of said elongated element in said through passage and a second part in said interior of said pressure vessel, introducing a freezable material into said through passage, surrounding said first part of said elongated element with said freezable material, freezing said freezable material in situ in said through passage such that the frozen material exerts an inward force against said first part of said elongated element and an outward force against said through passage, and sealing said first part of said elongated element in said through passage of said pressure vessel by said force exerted by said frozen material.

27. A method according to claim 26 further comprising pressurizing said interior of said pressure vessel, and pressure testing said elongated element in said pressurized pressure vessel.

28. A method according to claim 26 wherein said elongated element is a conductor, further comprising connecting a to-be-tested device to said second part of said conductor, disposing said device in said interior of said pressure vessel, and pressure testing said device in said pressurized pressure vessel as said frozen material effects sealing of said pressure vessel.

29. A method according to claim 26 wherein said through passage is designated first through passage, further comprising providing a second through passage Leading to said interior of said pressure vessel, disposing a third part of said elongated element in said second through passage on said pressure vessel with said second through passage being spaced from said first through passage, said second part of said elongated element being disposed between said first and third parts of said elongated element, introducing said freezable material into said second through passage of said pressure vessel, surrounding said third part of said elongated element with said freezable material, freezing said freezable material in situ in said second through passage such that said frozen material in said second through passage exerts an inward force against said third part of said elongated element and an outward force against said second through passage of said pressure vessel respectively, sealing said pressure vessel utilizing said frozen material in said second through passage of said pressure vessel, pressurizing said sealed pressurized vessel to thereby pressure test said second part of said elongated element in said pressure vessel.

30. A method according to claim 29 whereby said second part of said elongated element has a to-be-tested device connection thereto, further comprising disposing said device in said pressure vessel, said step of pressurizing said sealed pressurized vessel comprising pressure testing said device in said pressurized pressure vessel.

31. A method according to claim 26 wherein said through passage is designated a first through passage, further comprising providing a second through passage leading to said interior of said pressure vessel, disposing a third part of said elongated element in said second through passage of said pressure vessel with said second through passage being spaced from said first through passage, said interior of said pressure vessel extending between said first and second through passages, said second part of said elongated element being disposed in said interior of said pressure vessel, introducing said freezable material into said second through passage and into said interior of said pressure vessel, surrounding said second part and said third part of said elongated element with said freezable material, freezing said freezable material in situ in said second through passage such that the frozen material in said second through passage exerts an inward force against said third part of said elongated element and an outward force against said second through passage of said pressure vessel respectively, and trapping said freezable material in said interior of said pressure vessel by the frozen material in said first and second through passages of said pressure vessel.

32. A method according to claim 31 further comprising controlling the amount of trapped freezable material in said interior of said pressure vessel to enhance the clamping effect of the freezable material on said elongated element.

33. A method according to claim 31 further comprising continuing to effect freezing of said freezable material in said first and second through passages such that said continued freezing moves longitudinally in said pressure vessel toward said interior of said pressure vessel, whereby said continued freezing enhances the clamping effect of the freezable material on said elongated element.

34. A method for clamping an elongated element comprising disposing a part of said elongated element in a clamping enclosure, introducing a freezable material into said enclosure, surrounding said part of said elongated element with said freezable material, freezing said freezable material in situ in said enclosure such that the frozen material exerts an inward force against said part of said elongated element and an outward force against said enclosure, clamping said part of said elongated element to said enclosure by said forces exerted by said frozen material, and utilizing a pulling mechanism attached to said enclosure for pulling said enclosure which in turn pulls siad elongated element.

35. A method according to claim 34 wherein said elongated element is an underwater conductor which is adapted to be disposed under water during normal use, further comprising utilizing said clamping of said part of said elongated element to said enclosure on a ship for effecting clamping of said underwater conductor.

36. A clamping device for clamping an elongated element to a clamping enclosure disposed about a part of said element, freeze means between said part of said elongated element and said enclosure, said freeze means including a frozen material exerting a force inwardly against said part of said element and outwardly against said enclosure by virtue of having been frozen in situ such that said frozen material thereby clamps said elongated element to said enclosure, and tensioning means for effecting tensioning between said clamping enclosure and said elongated element such that said tensioning means tensions said elongated element as said part of said elongated element is clamped to said clamping enclosure.

* * * * *